United States Patent
Yoshida et al.

(10) Patent No.: US 6,733,092 B2
(45) Date of Patent: May 11, 2004

(54) TRAVEL DRIVING APPARATUS FOR A TRACK-TYPE VEHICLE

(75) Inventors: Tsuyoshi Yoshida, Katano (JP); Teiji Yamamoto, Kadoma (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/325,157

(22) Filed: Dec. 20, 2002

(65) Prior Publication Data
US 2003/0151305 A1 Aug. 14, 2003

(30) Foreign Application Priority Data
Feb. 12, 2002 (JP) ........................ 2002-033833

(51) Int. Cl.[7] ............... B62D 55/12; B65G 23/06; F16G 13/02; F16H 55/30
(52) U.S. Cl. ............... 305/195; 305/197; 305/199
(58) Field of Search ............... 305/124, 111, 305/113, 114, 115, 160, 164, 193, 194, 199, 201, 195 I, 197

(56) References Cited

U.S. PATENT DOCUMENTS

| | | | | |
|---|---|---|---|---|
| 1,964,533 A | * | 6/1934 | Rogers ........................ | 305/113 |
| 3,567,294 A | * | 3/1971 | Simpson et al. ............ | 305/201 |
| 3,680,929 A | * | 8/1972 | Hnilicka et al. ............ | 305/201 |
| 3,897,980 A | * | 8/1975 | Dester et al. ................ | 305/197 |
| 3,994,064 A | * | 11/1976 | Boggs et al. ................ | 305/197 |
| 4,034,618 A | | 7/1977 | Groff et al. | |
| 4,150,857 A | * | 4/1979 | Dester et al. ................ | 305/108 |
| 4,278,303 A | | 7/1981 | Livesay | |
| 4,407,551 A | * | 10/1983 | Baylor ........................ | 305/197 |
| 5,393,134 A | * | 2/1995 | Oertley ........................ | 305/199 |
| 5,829,850 A | * | 11/1998 | Ketting et al. ............... | 305/194 |
| 6,220,378 B1 | | 4/2001 | Oertley et al. | |

FOREIGN PATENT DOCUMENTS

| | | |
|---|---|---|
| JP | 10-045056 | 2/1998 |
| JP | 2000-153787 A | 6/2000 |

* cited by examiner

*Primary Examiner*—S. Joseph Morano
*Assistant Examiner*—Jason H. Bellinger
(74) *Attorney, Agent, or Firm*—Frishauf, Holtz, Goodman & Chick, P.C.

(57) ABSTRACT

A travel driving apparatus for a track-type earthmoving machine is provided which can reduce abrasion wear of a sprocket and a bushing and which enables easy replacement of worn members. A contact member is detachably mounted to an opposing surface of a track shoe to a sprocket, and a tooth top portion of the sprocket is brought into contact with the contact member, thereby securing a gap between a bushing of a track chain and a tooth bottom portion of the sprocket. The tooth top portion of the sprocket and a surface portion of the contact member have surface portions which are brought into contact with each other at a time when the sprocket rotates.

12 Claims, 4 Drawing Sheets

TRAVEL DRIVING APPARATUS FOR A TRACK-TYPE VEHICLE

BACKGROUND OF THE INVENTION

1. Field of the Invention

The present invention relates to a travel driving apparatus in a track-type earthmoving machine such as a bulldozer, a hydraulic excavator and the like, and more specifically to a travel driving apparatus for a track-type vehicle provided with a structure for enhancing durability of a track chain which is connected by links and a sprocket which drives the track chain.

2. Description of the Related Art

Conventionally, a traveling apparatus in a track-type earthmoving machine is structured such that a track chain formed in an endless shape is wound around a sprocket and an idler which are assembled in driving apparatuses disposed in front and rear sides of a vehicle body at a required distance so as to perform traveling. Further, the track chain has a lot of track links which are arranged in right and left sides at a predetermined interval, bushings which are provided between the right and left track links, and a plurality of connection pins which are inserted into the respective bushings and which connect the adjacent track links to each other. Track shoes are fastened to outer peripheral surfaces of the right and left track links, which are connected in a circular shape, by bolts, whereby the track chain is formed in an endless shape.

The traveling apparatus provided with the track chain having the above-described configuration is driven by a sequential engagement between the sprocket and the bushings in the track chain at a time of traveling. At a time of the engagement, the bushing in the track chain is engaged with a tooth bottom of the sprocket in a contact state, whereby a power is transmitted. However, when the track chain engaged with and driven by the sprocket moves to a grounded side, the track shoe is in contact with the ground surface and supports the vehicle body. Accordingly, an up-throwing force is applied to the sprocket via the bushings in the track shoe engaged with the teeth of the sprocket in the grounded side.

In the manner described above, not only a surface pressure with respect to the bushing caused by a rotational driving force, but also an up-throwing load generated for supporting the vehicle body and a load caused by a slip between an initial position at which the bushing is sequentially engaged and a position at a time of moving apart from the tooth portion are greatly applied to the tooth portion of the sprocket. Further, earth and sand which are flung up at a time of traveling on rough ground intrude into the engagement portion between the tooth portion of the sprocket and the bushing in the track chain. When the traveling operation is continuously performed, moreover, friction with the earth and sand becomes significant, and the bushings and the teeth of the sprocket are considerably worn. Further, vibration in the vehicle body is generated at a time of traveling. Particularly, in the track-type vehicle such as a bulldozer which performs an operation while intensely moving in a repeated manner for a long time, vibration is frequently generated, and considerable abrasion of the sprocket is generated. Accordingly, it is unavoidable to frequently replace specific parts of the sprocket and the track chain.

On the basis of the above-described condition, in order to reduce the wear and tear of the tooth portion in the sprocket of the travel driving apparatus, some proposals have been made. As one of them, there is an idea of driving without engaging the bushing in the track chain with the tooth bottom of the sprocket. In accordance with this idea, even when earth and sand intrude into the engagement portion at a time when the sprocket and the bushing are engaged with each other, it is possible to prevent friction caused by earth and sand between the sprocket and the bushing from being generated, due to a gap generated in the tooth bottom. Accordingly, it is possible to reduce abrasion and it is simultaneously possible to reduce vibration.

FIG. 3 is a sectional view partially showing a front face of a sprocket portion in a traveling apparatus for a track-type vehicle which is disclosed in Japanese Unexamined Patent Publication No. 10-45056. As shown in FIG. 3, a sprocket 30 is fastened and attached to an outer peripheral portion of a housing 41 in a reduction gear 40 by a bolt 42. When a track chain 20 is wound around the sprocket 30, a surface 32 in a track chain inner peripheral side of a link 21 of the track chain 20 is brought into contact with an outer peripheral surface 43 of a housing 41, and a gap F is provided between a tooth bottom portion 31 of the sprocket 30 and an outer peripheral surface of a bushing in the track chain 20.

Further, as another conventional art, there is a configuration in which an engagement portion between the sprocket and the track chain is changed with the intention of making it easy to replace a worn portion. For example, there is a configuration described in U.S. Pat. No. 6,220,378-B1. FIG. 4 is a partly sectional view of a side face which shows such a structure. In FIG. 4, a plurality of engagement members 52 are detachably mounted with a uniform pitch to an outer peripheral portion of a hub 51 which is mounted to a reduction gear 40, whereby a sprocket assembly 50 is constructed. A traction lug 62 is detachably mounted to a non-grounded surface of a crawler shoe 61 of a crawler belt 60 by a bolt 63. Groove portions 64 and 64 provided in front and rear end portions of the traction lug 62 of the track chain 60 are engaged with the engagement members 52 of the sprocket assembly 50 so as to drive the track chain 60, and are exposed to a radial load. That is, the engagement member 52 and the groove portion 64 of the traction lug 62 are simultaneously exposed to the driving force and the radial load. The engagement member 52 and the traction lug 62 which correspond to the abrasion members are freely attached to and detached from each other, and it is easy to replace them.

However, in the above-described conventional configurations, the following problems have arisen.

In the conventional art disclosed in Japanese Unexamined Patent Publication No. 10-45056, when the track chain 20 is wound around the sprocket 30 in FIG. 3, the surface 32 in the track chain inner peripheral side of the link 21 in the track chain 20 is brought into contact with the outer peripheral surface 43 of the housing 41 in the reduction gear 40. Accordingly, the outer peripheral surface 43 of the housing 41 is worn. In the case of being worn, it is necessary to replace the housing 41 of the reduction gear 40, so that a lot of time is required for replacing, and a cost of the replaced part is high. Further, since the surface 32 in the crawler belt inner peripheral side of the link 21 is considerably worn, the lifetime of the link is reduced. In addition, since it is generally very hard to perform the replacing operation of the track chain 20 including the link 21, and since a high cost is required for replacing these parts, in practice the frequency of replacing the link 21 and/or the track chain 20 is set to be less than the frequency of replacing the sprocket 30. However, since the frequency of replacing the link 21 becomes high for the above-described reason, a great economic loss is generated.

In the conventional art disclosed in U.S. Pat. No. 6,220,378, since the engagement member 52 and the traction lug 62 are simultaneously exposed to the driving force and the radial load, the lifetime of both becomes short, the frequency of replacement is increased, and it is necessary to frequently replace the engagement member 52 and the traction lug 62 which requires a high cost. Accordingly, there has arisen a problem that the maintenance cost is high.

The present invention has been made by taking the above-described problems into consideration, and an object of the present invention is to provide a travel driving apparatus for a track-type vehicle which can reduce abrasion in a sprocket and a bushing used in a connection portion of a link of a track chain and which can enable easy replacement of the worn members.

SUMMARY OF THE INVENTION

In order to achieve the object, according to one aspect of the present invention, a travel driving apparatus is provided for a track-type vehicle having a power unit, a sprocket that is rotated and driven by the power unit, an idler, and a track chain assembly including a plurality of links pivotally connected to one another to form an endless track chain. The travel driving apparatus includes: a bushing which connects links provided in right and left sides in a width direction of the track chain in an annular shape and which is engaged with a tooth of the sprocket so as to be driven; a track shoe which is mounted to an outer peripheral surface side of the links; and a contact member which is detachably mounted to an opposing surface of the track shoe to the sprocket and which is brought into contact with a tooth top portion of the sprocket so as to secure a gap between the bushing and a tooth bottom portion of the sprocket.

According to this aspect, the contact member which is brought into contact with the tooth top portion of the sprocket so as to secure the gap between the bushing and the tooth bottom portion of the sprocket is detachably mounted to the opposing surface of the track shoe to the sprocket. Accordingly, even when earth and sand intrude at a time of driving, the bushing and the tooth bottom portion of the sprocket are not worn by the earth and sand, and it is possible to reduce abrasion wear. Further, since the non-grounded surface side of the link is not brought into contact with the sprocket at a time when the link is wound around the sprocket, abrasion is reduced. The lifetime of the link can be improved, and it is possible to reduce vibration of a vehicle body.

According to another aspect of the present invention, in addition to the above-described aspect of the present invention, the configuration is made such that the tooth top portion of the sprocket and a surface portion of the contact member have surface portions which are brought into contact with each other at a time when the sprocket rotates.

According to this aspect, since the tooth top portion of the sprocket and the surface portion of the contact member in the track chain are brought into contact with each other in the surface portions at a time when the sprocket rotates, a contact area is increased, and a contact pressure per unit area becomes small so as to reduce the abrasion, so that it is possible to improve the lifetime of the apparatus against abrasion wear of the sprocket and the contact member.

According to still another aspect of the present invention, in addition to the above-described aspect of the present invention, three kinds of teeth in the sprocket take charge of part of the following roles: a) a role of receiving a forward driving force and a radial load; b) a role of receiving a backward driving force and the radial load; and c) a role of receiving the radial load.

According to this aspect, a gap between the bushing and the tooth which receives the backward driving force can be set to become small at a time of driving forward, and a gap between the bushing and the tooth which receives the forward driving force can be set to become small at a time of driving backward. Accordingly, it is possible to reduce an impact which is generated by a collision between the teeth of the sprocket and the bushing at a time of switching between the forward and backward movements, and it is possible to improve the lifetime of the apparatus and reduce noise.

According to yet another aspect of the present invention, the number of the teeth of the sprocket is a multiple of 3.

According to this aspect, since the number of the teeth of the sprocket is a multiple of 3, the sprocket can be structured so as to separate the sprocket by setting three teeth respectively having three roles to one set. Accordingly, it is possible to lighten the individual components, and it is easy to dissemble and assemble the components. Further, since the configuration can be made by a plurality of same parts, it is possible to reduce the cost of the apparatus.

According to yet another aspect of the present invention, at least one of the teeth of the sprocket is always positioned between the adjacent bushings.

According to this aspect, since the contact members of all the track shoes wound around the sprocket are brought into contact with the tooth top portion of the sprocket, the track chain is smoothly wound around the sprocket, and noise is reduced. Further, it is possible to increase a thickness in a peripheral direction of the tooth of the sprocket, and it is possible to improve the strength of the apparatus.

DETAILED DESCRIPTION OF THE INVENTION

Hereinafter, an embodiment of the present invention will be described in detail with reference to the drawings.

Figure 1:
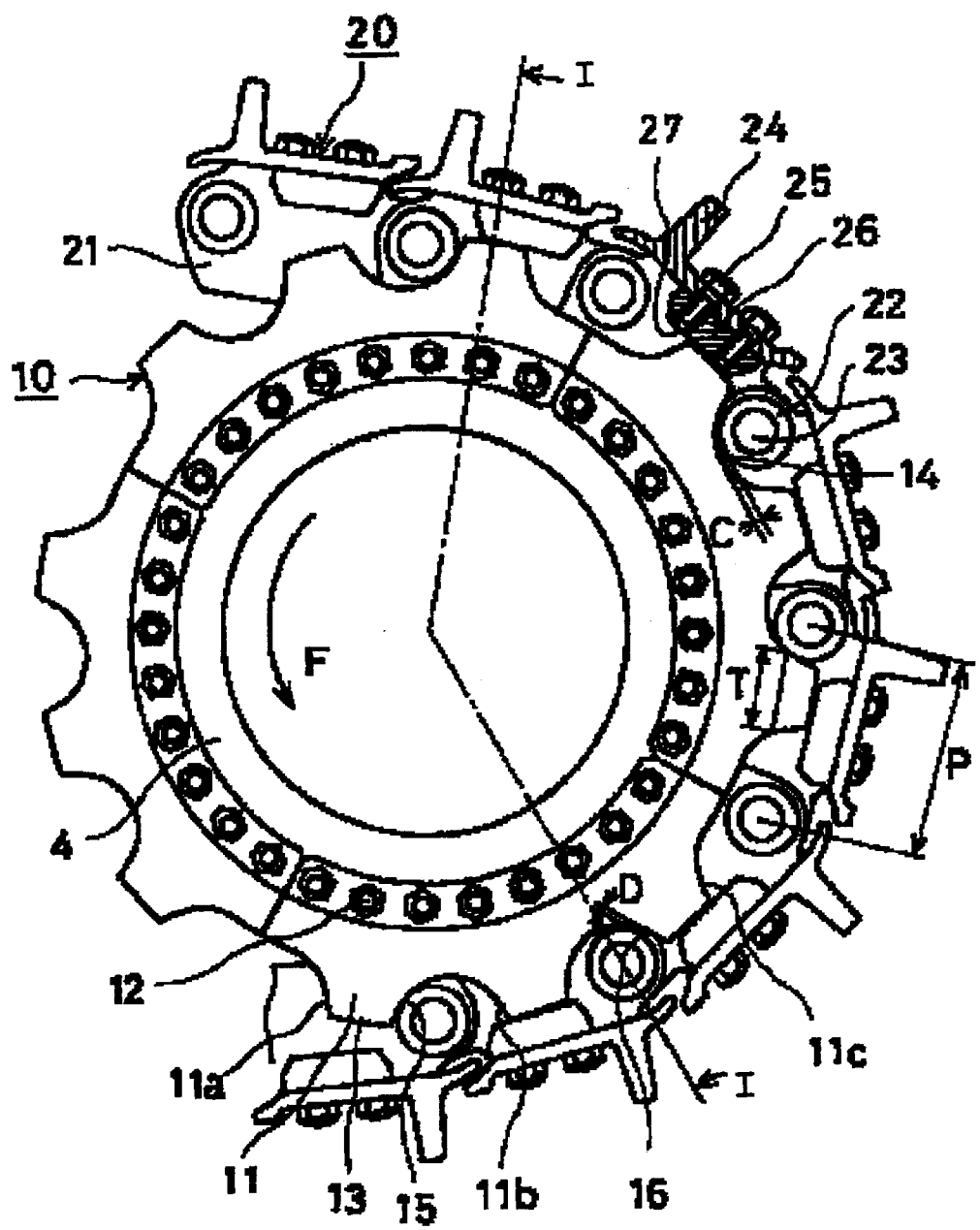
FIG. 1 is a sectional view partially showing a side face of a travel driving apparatus according to the present invention.
Figure 2:
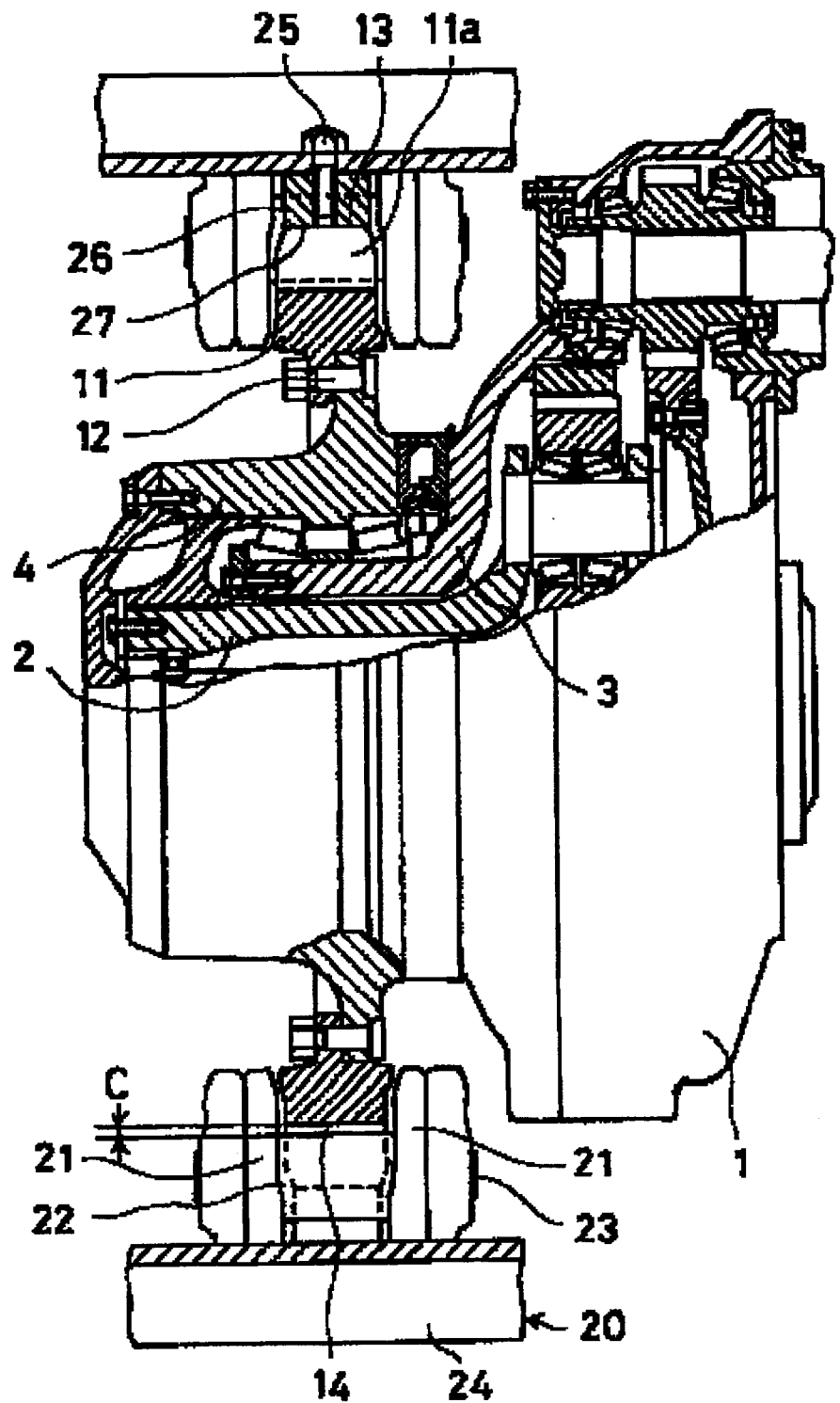
FIG. 2 is a view taken along line I—I in FIG. 1.
Figure 3:
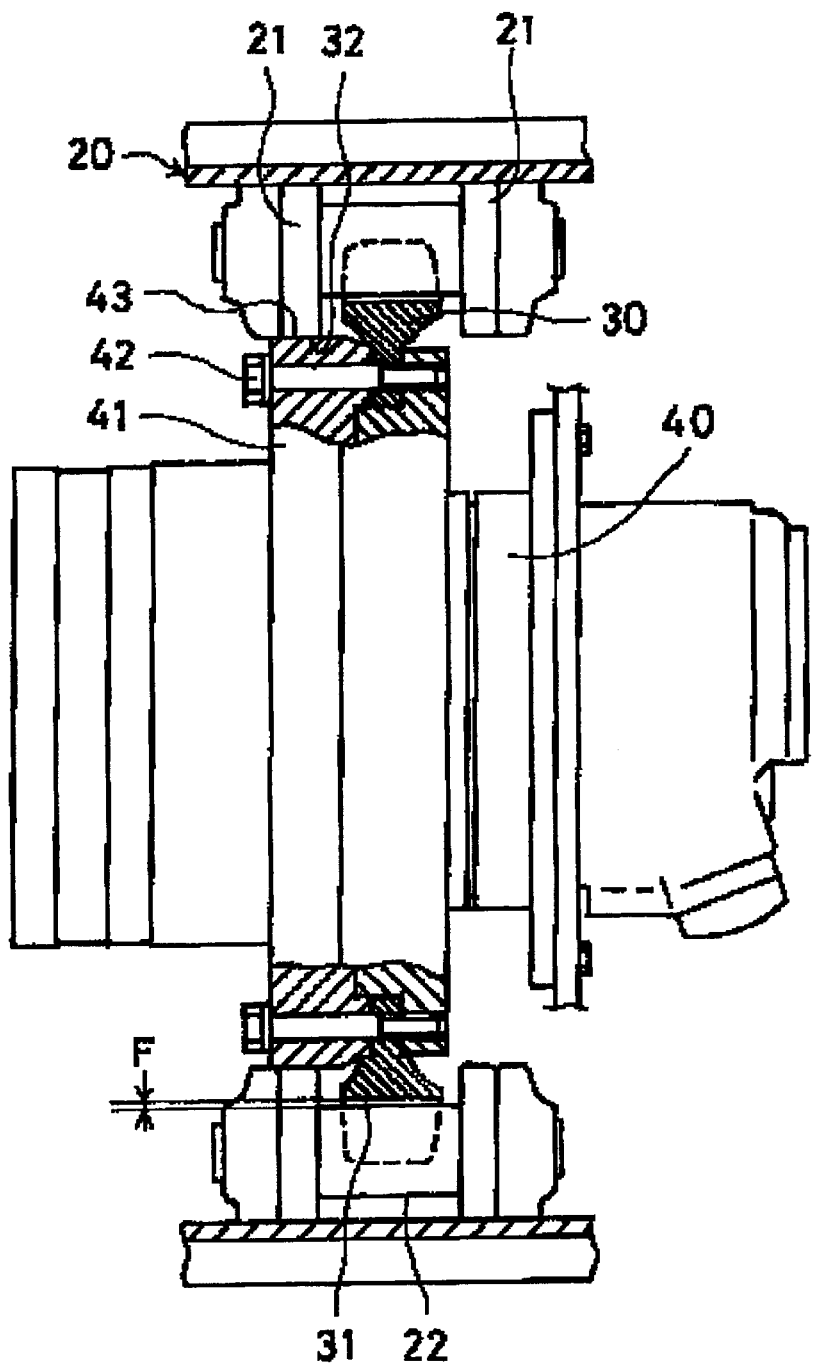
FIG. 3 is a sectional view partially showing a front face of a conventional travel driving apparatus in a first example.
Figure 4:
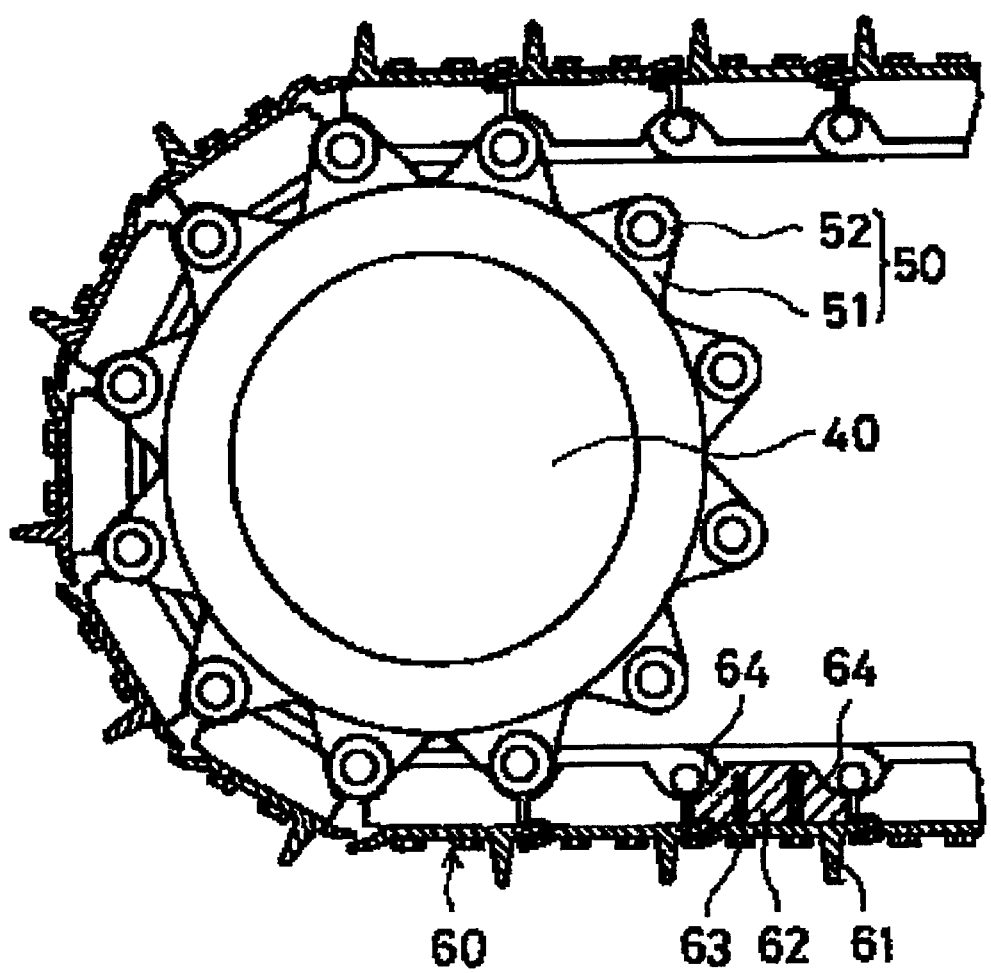
FIG. 4 is a sectional view partially showing a side face of a conventional travel driving apparatus in a second example.

FIG. 1 is a sectional view partially showing a side face of a sprocket of a travel driving apparatus according to the present invention, and FIG. 2 is a view taken along line I—I in FIG. 1. In FIGS. 1 and 2, an output shaft 2 of a reduction gear 1 is rotatably supported to a casing 3, and a wheel 4 connected to the output shaft 2 is rotatably mounted to an outer peripheral portion of the casing 3. Further, four sprocket segments 11, 11, 11 and 11 constituting a sprocket 10 are fastened and attached to an outer peripheral portion of the wheel 4 by bolts 12. Three teeth 11a, 11b and 11c are provided in each of the sprocket segments 11, and a surface portion 13 having a predetermined width in a peripheral direction is formed on an outer peripheral surface at a leading edge portion of each of the teeth 11a, 11b and 11c. Accordingly, in the present embodiment, the number of teeth of the sprocket 10 is twelve, which is multiple of three.

The above-described three teeth 11a, 11b and 11c respectively have different roles. That is, the tooth 11a receives a driving force and a radial load at a time of forward moving, the adjacent tooth 11b receives only a radial load, and the next tooth 11c receives a driving force and a radial load at a time of backward moving.

Further, a track chain 20 is provided with a pair of left and right (in a width direction of the track chain) links 21 and 21, a bushing 22 and a pin 23 which connect the pair of links 21 and 21 and connect between the longitudinally adjacent links, a track shoe 24 which is fastened and attached to the pair of left and right links 21 and 21 by a bolt, and a contact member 26 which is fastened and attached in a non-grounded surface side of the track shoe 24 and between the pair of left and right links 21 and 21 by a bolt 25. A surface portion 27 having a predetermined width in a peripheral direction of the track chain is provided in a surface portion (in an inner peripheral side of the track chain) of the contact member 26.

When the track chain 20 is wound around an outer peripheral portion of the sprocket 10, three kinds of teeth 11a, 11b and 11c of the sprocket 10 are respectively positioned one by one between the adjacent bushings 22 and 22 of the track chain 20. A tooth thickness T of the respective teeth 11a, 11b and 11c in a peripheral direction is set to one half to one third of a pitch P between the adjacent bushings 22 and 22.

Further, the surface portion 13 of the leading edge portion in the teeth 11a, 11b and 11c, and the surface portion 27 of the contact member 26 are in contact with each other, whereby a predetermined distance C is secured between a tooth bottom portion 14 in each of the teeth 11a, 11b and 11c and the bushing 22.

FIG. 1 shows a state at a time of forward moving in which the sprocket 10 rotates in a direction of an arrow F (in a counterclockwise direction). A surface of the tooth 11a in a forward moving side is in contact with the bushing 22, and a small gap D is provided between a surface 16 of the tooth 11c in a backward moving side and the bushing 22, at this time.

Next, an operation of the travel driving apparatus will be described. In FIG. 1, when rotating the sprocket 10 in a direction of the arrow F, the surface 15 of the lower tooth 11a in the forward moving side is brought into contact with the bushing 22 so as to transmit the driving force in the forward moving direction. When further rotating, the surface portion 13 in the leading edge of the tooth 11a is brought into contact with the surface portion 27 of the contact member 26 in the track shoe 24, and receives the radial load. The surface portion 13 of the tooth 11b is brought into contact with the surface portion 27 of the contact member 26, and receives the radial load. The surface portion 13 in the leading edge of the tooth 11c is brought into contact with the surface portion 27 of the contact member 26 in the track shoe 24, and receives the radial load, and the small gap D is generated between the surface 16 in the backward moving side and the bushing 22. During this period, the predetermined distance C is always secured between the tooth bottom portion 14 and the bushing 22.

Since the travel driving apparatus of the track-type vehicle according to the present invention has the above-described configuration, the following effects can be obtained.

Since the configuration is made such that the contact member mounted to the track shoe is brought into contact with the tooth top portion of the sprocket, a predetermined gap is secured between the tooth bottom portion of the sprocket and the bushing connecting the left and right links. Accordingly, the sprocket and the bushing do not receive the radial load, whereby abrasion wear, the frequency of part replacement, noise and vibration can all be reduced.

Since the non-grounded surface side (the inner peripheral side) of the track chain link is not brought into contact with the sprocket at a time when the track chain is wound around the sprocket, the lifetime against abrasion wear can be improved.

Since the surface portions are provided in the respective contact portions in the tooth top of the sprocket and the contact member mounted to the track shoe, the contact pressure is reduced and the lifetime against abrasion wear can be improved.

Three kinds of teeth of the sprocket take charge of part of the following roles: a) the role of receiving the forward driving force and the radial load; b) the role of receiving the backward driving force and the radial load; and c) the role of receiving the radial load, respectively. As a result, it is possible to reduce the gap between the tooth of the sprocket which receives the driving force in the other direction and the bushing, at a time of being driven in either the forward or backward directions. In addition, the shock generated by the collision between the tooth the sprocket and the bushing at a time of switching between the forward and backward movements becomes small, and it is possible to improve durability and reduce noise.

Since a whole of the sprocket is constructed by the separation segments in each set by setting three kinds of the sprockets to one set, the individual segments become light, and it is easy to dissemble and assemble the travel driving apparatus. Further, since the configuration can be constructed by a plurality of common segments, it is possible to reduce the manufacturing cost.

Since the tooth of the sprocket is always positioned between the bushings, the track chain can be smoothly wound around the sprocket, and it is possible to reduce noise and vibration. Further, since the tooth thickness can be increased, it is possible to improve durability.

Since it is easy to dissemble and assemble the sprocket and the contact member which are replaced at a time of maintenance, and since the part costs are inexpensive, the structure is economical.

Other aspects, objects and advantages of this invention can be obtained from a further study of the drawings, the disclosure and the appended claims.

What is claimed is:

1. A travel driving apparatus for a track-type vehicle having a power unit, a sprocket that is rotated and driven by said power unit, an idler, and a track chain including a plurality of links pivotally connected to one another, said travel driving apparatus comprising:

a bushing which connects links provided in right and left sides in a width direction of the track chain in an annular shape and which is engaged with a tooth of the sprocket so as to be driven;

a track shoe which is mounted to an outer peripheral surface side of the links; and a contact member which is detachably mounted to an opposing surface of the track shoe to the sprocket and which is brought into contact with a tooth top portion of the sprocket so as to secure a gap between the bushing and a tooth bottom portion of the sprocket.

2. The travel driving apparatus for a track-type vehicle according to claim 1, wherein:

at least one tooth of the sprocket is always positioned between adjacent bushings.

3. The travel driving apparatus for a track-type vehicle according to claim 1, wherein:

the tooth top portion of the sprocket and a surface portion of the contact member have surface portions which are brought into contact with each other at a time when the sprocket rotates.

4. The travel driving apparatus for a track-type vehicle according to claim 3, wherein:

at least one tooth of the sprocket is always positioned between adjacent bushings.

5. The travel driving apparatus for a track-type vehicle according to claim 1, wherein:

the sprocket comprises teeth for receiving a forward driving force and a radial load, teeth for receiving a backward driving force and the radial load, and teeth for receiving the radial load.

6. The travel driving apparatus for a track-type vehicle according to claim 5, wherein:

at least one tooth of the sprocket is always positioned between adjacent bushings.

7. The travel driving apparatus for a track-type vehicle according to claim 5, wherein:

the sprocket comprises a number of teeth which is a multiple of 3.

8. The travel driving apparatus for a track-type vehicle according to claim 7, wherein:

at least one tooth of the sprocket is always positioned between adjacent bushings.

9. The travel driving apparatus for a track-type vehicle according to claim 3, wherein:

the sprocket comprises teeth for receiving a forward driving force and a radial load, teeth for receiving a backward driving force and the radial load, and teeth for receiving the radial load.

10. The travel driving apparatus for a track-type vehicle according to claim 8, wherein:

at least one tooth of the sprocket is always positioned between adjacent bushings.

11. The travel driving apparatus for a track-type vehicle according to claim 9, wherein:

the sprocket comprises a number of teeth which is a multiple of 3.

12. The travel driving apparatus for a track-type vehicle according to claim 11, wherein:

at least one tooth of the sprocket is always positioned between adjacent bushings.

* * * * *